June 30, 1925.
E. C. TREESE
MINING MACHINE
Original Filed Nov. 19, 1921
1,544,077
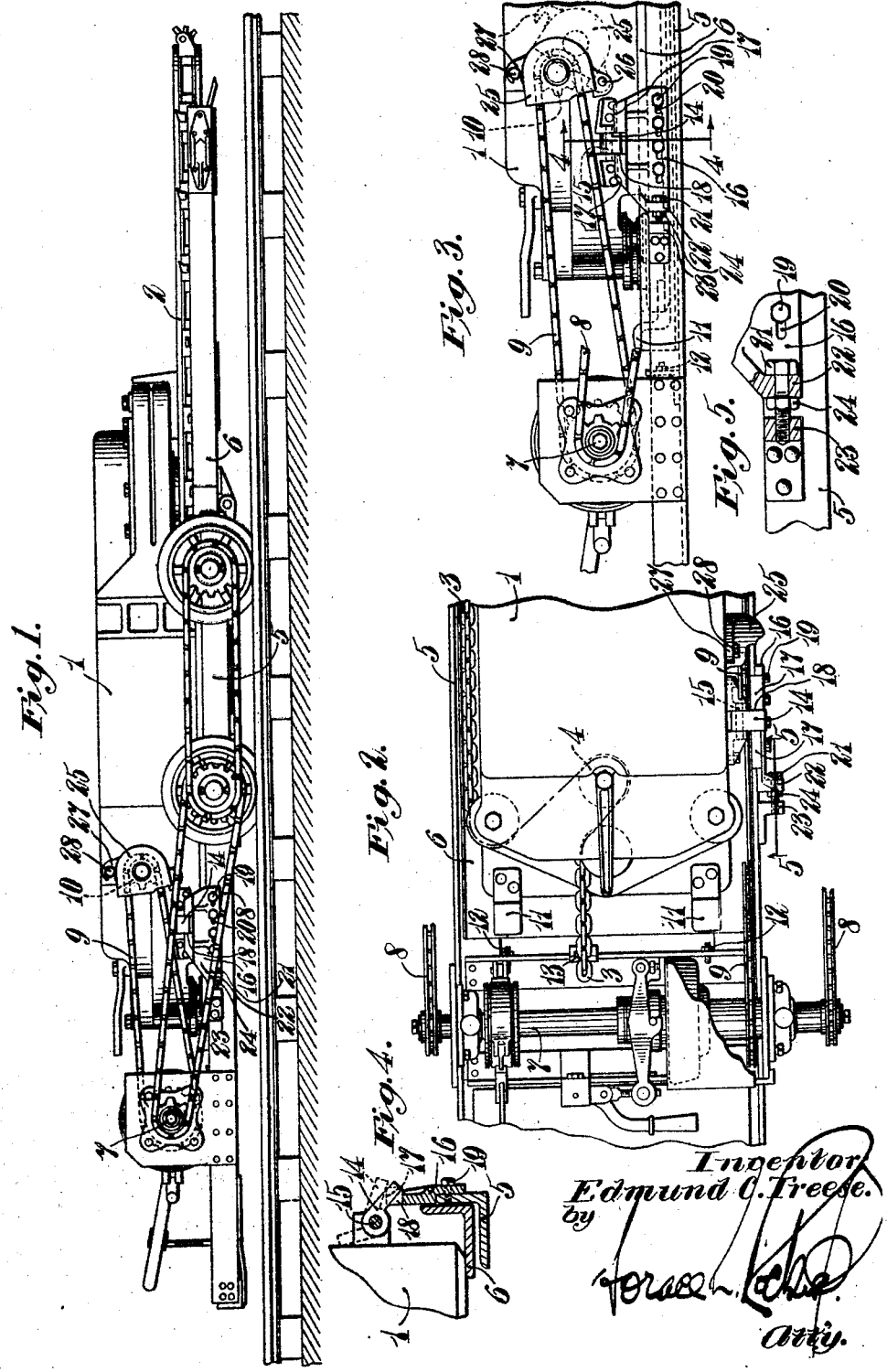

Patented June 30, 1925.

1,544,077

UNITED STATES PATENT OFFICE.

EDMUND C. TREESE, OF HUNTINGTON, WEST VIRGINIA, ASSIGNOR TO SULLIVAN MACHINERY COMPANY, A CORPORATION OF MASSACHUSETTS.

MINING MACHINE.

Application filed November 19, 1921, Serial No. 516,494. Renewed December 5, 1924.

*To all whom it may concern:*

Be it known that I, EDMUND C. TREESE, a citizen of the United States, residing at Huntington, in the county of Cabell and State of West Virginia, have invented certain new and useful Improvements in Mining Machines, of which the following is a full, clear, and exact specification.

My invention relates to mining machines. It has for its object to provide an improved truck driving connection for such machines whereby the truck driving connections driven from the machine may be connected and adjusted in an improved manner and maintained in the desired relation during transport.

In the accompanying drawings I have shown for purposes of illustration one embodiment which my invention may assume in practice.

In these drawings,—

Fig. 1 is a side elevation of a mining machine and truck equipped with this form of my improvement.

Fig. 2 is an enlarged plan view of an intermediate portion of the rear end of the machine and truck.

Fig. 3 is a side elevation of the mechanism shown in Fig. 2.

Fig. 4 is a detail sectional view on line 4—4 of Fig. 3.

Fig. 5 is a detail sectional view on line 5—5 of Fig. 2.

In this illustrative construction I have shown a mining machine 1, which may be of any desired type, herein including a usual cutter chain carrying cutter bar 2 and adapted to be propelled relative to a flexible feeding member, herein illustrated as a feed chain 3, by rotation of its feed operating member, herein indicated as a feed sprocket 4. As shown, this mechanism is mounted on a truck 5 which may also be of any usual construction, herein adapted slidably to receive the mining machine and provided with an overlying tilting portion 6 so that the machine may move off and on to the truck with facility. Connections are also provided whereby the machine may drive the truck wheels when on the truck, the same herein including a truck driving shaft 7 on the rear end of the truck operatively connected through forwardly and downwardly extending chain and sprocket connections 8 to the truck wheels and through a forwardly and upwardly extending chain and sprocket connection 9 with a truck driving sprocket 10 on the machine driven thereby and extending laterally therefrom.

In my improved construction the machine 1 is slidable on the truck and relative to the rear end of the tilting member 6 until any suitable portion or portions of the rear end of the machine frame, herein laterally spaced extensions 11, engage with one or more adjustable members on the truck, herein set screws 12, it being understood that the machine in this movement is moving onto the truck and relative to its flexible feeding member 3 which is then connected to a feed member abutment 13 on the rear end of the truck. Herein, one side of the mining machine also carries a latch member 14 pivotally mounted on suitable brackets on a longitudinal pivot 15 at one side of the truck and adapted to be swung up over center into the inoperative position indicated at the left in dotted lines in Fig. 4 wherein its free end engages the side of the machine, or down into the plurality of positions indicated at the right in Fig. 4 as the latch cooperates with a cooperating latch member 16 carried on the side of the truck. As shown, the cooperating latch member 16 is provided with latch lifting surfaces 17 on opposite sides of a central latch receiving notch 18 and the entire member 16 is adjustable longitudinally of the truck frame and relative to bolt connections 19 through the provision of slots 20 in the member 16 and an adjusting screw 21 threaded in an extension 22 on the member 16 and in an extension 23 on the truck, a lock nut 24 preferably being provided to hold it in adjusted position, thus permitting the member 16 to be held in any desired position relative to the truck frame. Attention is also directed to the fact that a pivoted guard 25 is provided for the sprocket 10, the guard herein being pivoted at 26 and having a hook 27 releasably connected by suitable means 28 to permit the guard to be swung about its pivot to permit access to or to protect the sprocket 10.

In the operation of my improved construction, the mining machine is fed onto the truck in the usual manner, its flexible feeding member then being connected to the abutment 13 and the feed operating member 4 rotated in such a manner as to cause the machine to move along the flexible feeding member and up onto the truck. During this operation, the latch member 14 preferably occupies the inoperative dotted line position shown at the left in Fig. 4. When the machine has been moved so far that the latch 14 has passed the notch 18, the guard 25 is swung back and the chain 9 is connected to the sprocket 10, the machine then being so near the other sprocket of this chain as to permit an easy connection of the chain. When this chain has been placed upon its sprocket 10, the latch 14 is thrown down and the machine is then moved in any suitable manner, as by a reverse connection of its feed chain to the front end of the truck, in a reverse direction until the latch 14 riding over the adjacent surface 17 drops into the notch 18 to lock the machine in place upon the truck ready for transport and with a predetermined tension upon the chain 9. In a preferred use of my invention, the latch 14 is thrown down as soon as it passes over the notch 18 on the inward movement of the machine, the same then riding over the surface 17 toward the rear of the truck and when the machine is moved in the opposite direction automatically riding over this surface in the reverse direction and dropping into the notch. Obviously when it is desired to unload the machine, a slight rearward movement of the machine relative to the abutment 13 may be obtained whenever the latch 14 is raised and the chain 9 disconnected in such a manner as to thereafter permit the machine to be unloaded in a usual manner. As indicated above, the latch 14 is preferably then thrown up into its inoperative dotted position shown at the left in Fig. 4 and remains in this position until the machine has again been loaded upon the truck. It will also be noted that if the latch 14 is thrown down, the surface 17 nearer the front end of the truck will cause the same to ride up and drop into the notch 18 and thereby, by arresting the rearward movement of the machine, indicate to the operator the necessity for raising the latch to let it slide over the rearward surface 17.

As a result of my improvement it will be observed that means are provided to limit the movement of the machine relative to the truck in such a manner as with ordinary care to insure proper tensioning of the chain 9. It will also be observed that through the provision of the adjustable member 16, it is possible to adjust this member relative to the latch 14 in such a manner as to take up wear should the same occur or for different lengths of the chain 9 and thus materially increase the effective life of the mechanism. Attention is also directed to the fact that my improved mechanism not only has these functions but also functions during transport to retain the machine securely in fixed longitudinal position with respect to the truck.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining apparatus, a mining machine truck, a mining machine slidable thereover during loading or unloading and having flexible truck driving connections connected thereto and a single longitudinally adjustable means between said machine and truck for insuring proper tensioning of said flexible driving connections in either direction.

2. In a mining apparatus, a mining machine truck, a mining machine slidable thereover during loading or unloading and having flexible truck driving connections connected thereto, and unitary means between said machine and truck for insuring proper tensioning of said flexible driving connections and locking said machine in a given longitudinal position on said truck.

3. In a mining apparatus, a mining machine truck, a mining machine slidable thereover during loading or unloading and having flexible truck driving connections connected thereto, and a single means between said machine and truck for insuring proper tensioning of said flexible driving connections and locking said machine in a given longitudinal position on said truck.

4. In a mining apparatus, a mining machine truck, a mining machine slidable thereover during loading or unloading and having flexible truck driving connections connected thereto, and a single adjustable means between said machine and truck for insuring proper tensioning of said flexible driving connections and locking said machine in a given longitudinal position on said truck.

5. In a mining apparatus, a mining machine truck, a mining machine slidable thereover during loading or unloading and having flexible truck driving connections connected thereto, and means between said machine and truck for insuring proper tensioning of said flexible driving connections, said means including cooperating latching means on said machine and truck and said latching means comprising mutually cooperating elements operative to inhibit relative longitudinal movement between said machine and truck in either direction.

6. In a mining apparatus, a mining machine truck, a mining machine slidable thereover during loading or unloading and having flexible truck driving connections connected thereto, and means between said machine and truck for insuring proper tensioning of said flexible driving connections, said means including a pivoted latch on said machine and a cooperating longitudinally adjustable latch engaging member on said truck.

7. In a mining apparatus, a mining machine truck, a mining machine slidable thereover during loading or unloading and having flexible truck driving connections connected thereto, and means between said machine and truck for insuring proper tensioning of said flexible driving connections, said means including cooperating latching means on said machine and truck and means for adjusting one of the elements thereof to different fixed positions relative to its support to alter the point of cooperation between said elements.

8. In a mining apparatus, a mining machine truck, a mining machine slidable thereover and having flexible truck driving connections connected thereto, and means between said machine and truck for insuring proper tensioning of said flexible driving connections, said means including cooperating latching means on said machine and truck operative per se to inhibit relative movement in either direction between said machine and truck and means for adjusting the element of said latching means carried on said truck longitudinally of the latter.

9. In a mining apparatus, a mining machine truck, a mining machine slidable thereover during loading or unloading and having flexible truck driving connections connected thereto, and means for holding said machine in position on said truck with said flexible connection under proper tension including a pivotal latch and a manually adjustable member cooperating therewith and engageable by said latch.

10. In a mining apparatus, a mining machine truck, a mining machine slidable thereover during loading or unloading and having flexible truck driving connections connected thereto, and means for holding said machine in position on said truck with said flexible connection under proper tension including a pivoted latch carried on said machine and a manually adjustable member cooperating therewith and adjustable on said truck and engageable by said latch.

11. In a mining apparatus, a mining machine truck, a mining machine slidable thereover during loading and unloading, a pivoted latch carried by said machine, a latch engaging member carried by said truck, an abutment means carried by said truck, and adjustable means disposed between said latch engaging member and said abutment.

12. In a mining apparatus, a mining machine truck, a mining machine slidable thereover during loading and unloading, a pivoted latch carried by said machine, a latch receiving member carried by said truck, an abutment means carried by said truck, adjustable means disposed between said latch receiving member and said abutment means, and means for holding said latch receiving member in adjusted position.

13. In a mining apparatus, a wheeled mining machine truck having an adjustable abutment on its side presenting longitudinally spaced abutment portions, a mining machine slidable over said truck during loading and unloading, flexible connections between said machine and the truck wheels, and means carried by the side of said machine adapted to engage the adjustable abutment carried by the side of said truck to be received between the portions thereof.

14. In a mining apparatus, a mining machine truck, a mining machine slidable thereover and having flexible truck driving connections connected thereto, and means between said machine and truck for insuring proper tensioning of said flexible driving connections, said means including a latch on the side of said machine movable about a longitudinal axis into and out of operative position and a notched cooperating latch member carried on the side of said truck and having a surface over which said latch may ride disposed at one side of its notch.

15. In a mining apparatus, a mining machine truck, a mining machine slidable thereover and having flexible truck driving connections connected thereto, and means between said machine and truck for insuring proper tensioning of said flexible driving connections, said means including a latch on the side of said machine movable about a longitudinal axis into and out of operative position and a notched cooperating latch member carried on the side of said truck and having a surface over which said latch may ride disposed at each side of its notch.

16. In a mining apparatus, a mining machine truck, a mining machine slidable thereover and having flexible truck driving connections connected thereto, and means between said machine and truck for insuring proper tensioning of said flexible driving connections, said means including a latch on the side of said machine movable about a longitudinal axis into and out of operative position, a notched cooperating latch member carried on the side of said truck and having a surface over which said latch may ride disposed at one side of its notch, and means for adjusting said notched member longitudinally of said truck.

17. In a mining apparatus, a mining machine truck, a mining machine slidable thereover and having flexible truck driving connections connected thereto, and means between said machine and truck for insuring proper tensioning of said flexible driving connections, said means including a latch on the side of said machine movable about a longitudinal axis into and out of operative position, a notched cooperating latch member carried on the side of said truck and having a surface over which said latch may ride disposed at each side of its notch, and means for adjusting said notched member longitudinally of said truck.

18. In a mining apparatus, a wheeled mining machine truck, a mining machine slidable thereon having a truck driving sprocket rotatable on a transverse axis and projecting laterally therefrom, flexible driving connections between said sprocket and the truck wheels including a chain connectible with said sprocket when said machine is moved into a predetermined position on said truck, an adjustable sprocket guard carried on said machine and movable into and out of sprocket enclosing position to permit the connection or removal of said chain, and means between said machine and truck for insuring proper tensioning of said chain and locking said machine in a given longitudinal position on said truck.

In testimony whereof I affix my signature.

EDMUND C. TREESE.